United States Patent
Herdendorf et al.

(10) Patent No.: US 11,176,963 B1
(45) Date of Patent: Nov. 16, 2021

(54) BRAKE CRAWLER FOR ELEVATOR-TYPE HARD DISK DRIVES

(71) Applicant: Seagate Technology LLC, Fremont, CA (US)

(72) Inventors: Brett R. Herdendorf, Mound, MN (US); Riyan Alex Mendonsa, Minneapolis, MN (US); Krishnan Subramanian, Shakopee, MN (US); Wolfgang Rosner, Burnsville, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/016,326

(22) Filed: Sep. 9, 2020

(51) Int. Cl.
*G11B 5/54* (2006.01)
*G11B 5/48* (2006.01)
*G11B 5/55* (2006.01)
*G11B 21/22* (2006.01)
*G11B 17/02* (2006.01)

(52) U.S. Cl.
CPC .......... *G11B 5/4873* (2013.01); *G11B 5/4813* (2013.01); *G11B 5/54* (2013.01); *G11B 5/5521* (2013.01); *G11B 21/22* (2013.01); *G11B 5/4833* (2013.01); *G11B 5/4846* (2013.01); *G11B 17/021* (2013.01)

(58) Field of Classification Search
None
See application file for complete search history.

(56) References Cited

U.S. PATENT DOCUMENTS

| | | | |
|---|---|---|---|
| 5,410,206 A * | 4/1995 | Luecke et al. | H02N 2/101 310/317 |
| 11,031,037 B1 * | 6/2021 | Garbarino | G11B 5/4813 |
| 2008/0055773 A1 | 3/2008 | Nigam | |
| 2009/0154004 A1 | 6/2009 | Bedillion et al. | |
| 2020/0227077 A1 | 7/2020 | Sukla et al. | |

* cited by examiner

*Primary Examiner* — Craig A. Renner
(74) *Attorney, Agent, or Firm* — Holzer Patel Drennan (57) ABSTRACT

A brake crawler for an elevator-type hard disk drive generally includes a first and second set of clamp arms vertically arranged, each of the first and second sets of clamp arms being capable of exerting a clamping force on a shaft or slider via activation or deactivation of an actuator element associated with each set of clamp arms. The brake crawler further includes an actuator element disposed between the first and second set of clamp arms which allows for movement of the first set of clamp arms away from the second set of clamp arms upon a change in state of the actuator element. Via a specific sequence of activating and deactivating various of the actuator elements associated with the brake crawler, the brake crawler is capable of inch worm-type movement up and down the shaft.

20 Claims, 8 Drawing Sheets

BRAKE CRAWLER FOR ELEVATOR-TYPE HARD DISK DRIVES

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

Various embodiments of brake crawlers for elevator-type hard disk drives and associated methods are described herein. In some embodiments, a brake crawler assembly configured for vertically moving an arm assembly or other hard disk drive component like a ramp or disk, along a slider shaft in a hard disk drive includes a first set of clamp arms and a second set of clamp arms positioned below the first set of clamp arms. Each of the first and second sets of clamp arms include a base portion including a recess within which is disposed at least one actuator element (e.g., first piezoelectric element for the first set of clamp arms and second piezoelectric element for the second set of clamp arms), a first clamp arm extending from one end of the base portion, and a second arm extending from a second end of the base portion in the same direction as the first clamp arm, with an open area provided between the first and second clamp arms. The brake crawler further includes at least another actuator element (e.g., third piezoelectric element) disposed between the base portion of the first set of clamp arms and the base portion of the second set of clamp arms.

In some embodiments, a method of moving an arm assembly or other component of a hard disk drive vertically along a slider shaft of a hard disk drive includes providing an arm assembly or other hard disk drive component through which a slider shaft passes such that the arm assembly or other component is capable of moving vertically along the slider shaft, the arm assembly or other component having a brake crawler incorporated therein. The brake crawler includes a first set of clamp arms and a second set of clamp arms. Each of the first and second sets of clamp arms include a base portion including a recess within which is disposed at least one actuator element (e.g., first piezoelectric element for the first set of clamp arms and second piezoelectric element for the second set of clamp arms), a first clamp arm extending from one end of the base portion, and a second arm extending from a second end of the base portion in the same direction as the first clamp arm, with an open area provided between the first and second clamp arms. The brake crawler further includes at least one actuator element (e.g., third piezoelectric element) disposed between the base portion of the first set of clamp arms and the base portion of the second set of clamp arms. The method further includes activating the first actuator element such that the first set of clamp arms exerts a clamp force against the slider shaft, deactivating the third actuator element such that the terminal ends of the first and second clamp arms of the second set of clamp arms move away from the terminal ends of the first and second clamp arms of the first set of clamp arms, activating the second actuator element such that the second set of clamp arms exerts a clamp force against the slider shaft, deactivating the first actuator element such that the first set of clamp arms releases the slider shaft, and activating the third actuator element such that the terminal ends of the first and second clamp arms of the first set of clamp arms moves closer to the terminal ends of the first and second clamp arms of the second set of clamp arms.

In some embodiments, a method of moving an arm assembly or other component of a hard disk drive vertically along a slider shaft of a hard disk drive includes providing an arm assembly or other hard disk drive component through which a slider shaft passes such that the arm assembly or other component is capable of moving vertically along the slider shaft, the arm assembly or other component having a brake crawler incorporated therein. The brake crawler includes a first set of clamp arms and a second set of clamp arms. Each of the first and second sets of clamp arms include a base portion including a recess within which is disposed at least one actuator element (e.g., first piezoelectric element for the first set of clamp arms and second piezoelectric element for the second set of clamp arms), a first clamp arm extending from one end of the base portion, and a second arm extending from a second end of the base portion in the same direction as the first clamp arm, with an open area provided between the first and second clamp arms. The brake crawler further includes at least one actuator element (e.g., third piezoelectric element) disposed between the base portion of the first set of clamp arms and the base portion of the second set of clamp arms. The method further includes activating the first actuator element such that the first set of clamp arms exerts a clamp force against the slider shaft, deactivating the third actuator element such that the terminal ends of the first and second clamp arms of the second set of clamp arms move away from the terminal ends of the first and second clamp arms of the first set of clamp arms, activating the second actuator element such that the second set of clamp arms exerts a clamp force against the slider shaft, deactivating the first actuator element such that the first set of clamp arms releases the slider shaft, and deactivating the third actuator element such that the terminal ends of the first and second clamp arms of the first set of clamp arms moves closer to the terminal ends of the first and second clamp arms of the second set of clamp arms.

BRIEF DESCRIPTION OF THE DRAWINGS

A further understanding of the nature and advantages of the present technology may be realized by reference to the figures, which are described in the remaining portion of the specification.

DETAILED DESCRIPTION

Elevator-type or multi-disk type hard disk drives generally provide for multiple readable media to be stacked vertically within a single device, while providing a means for reading each of the individual readable media. In some implementations, this takes the form of an arm moveable about a Z-axis, the arm having disposed at the terminal end a read-write head capable of reading data from and/or writing data to one of the readable media. In some embodiments, the arm moves up and down a shaft or slider in order to access different readable media in the stack. Described herein is a brake crawler device that in some embodiments may be used to move the arm assembly up and down the shaft or slider in a precise manner such that each readable media in a stack of readable media can be accurately accessed by the arm and read/write head disposed at the terminal end of the arm. The brake crawler described herein is also capable of locking or braking the arm assembly in place along the shaft using the same mechanisms as are used for movement of the arm assembly in the Z-axis, thereby providing a simplified design with fewer parts. While the detailed description of various embodiments of the brake crawler provided below focuses primarily on movement of an arm assembly within a hard disk drive, it should be appreciated that the brake crawler can also be used for moving any other component of the hard disk drive which requires movement along a Z-axis, and may also be used in connection with devices other than hard disk drives.

Figure 1:
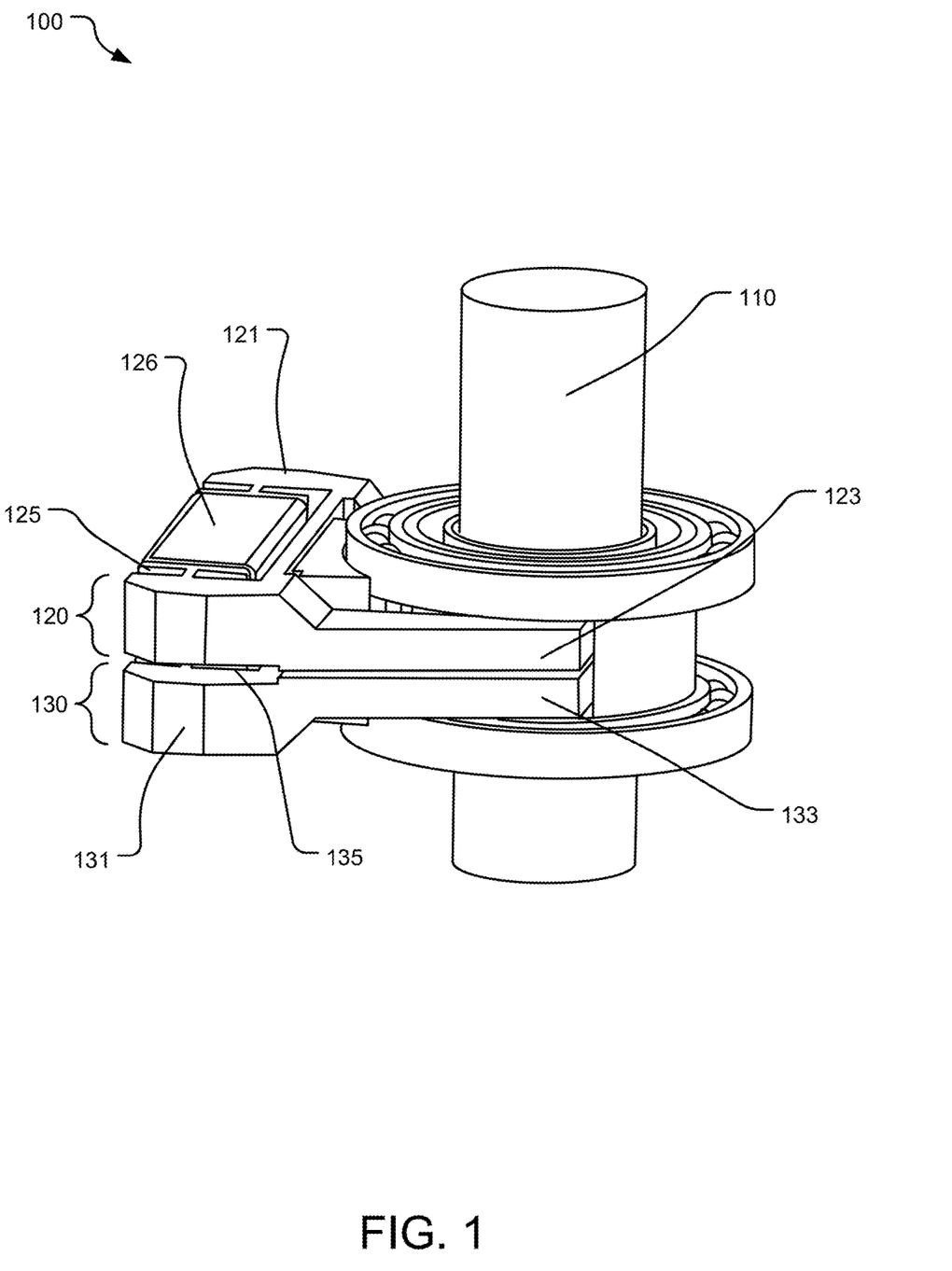
FIG. 1 presents a perspective view of a brake crawler according to one aspect of the present disclosure.
Figure 2A:
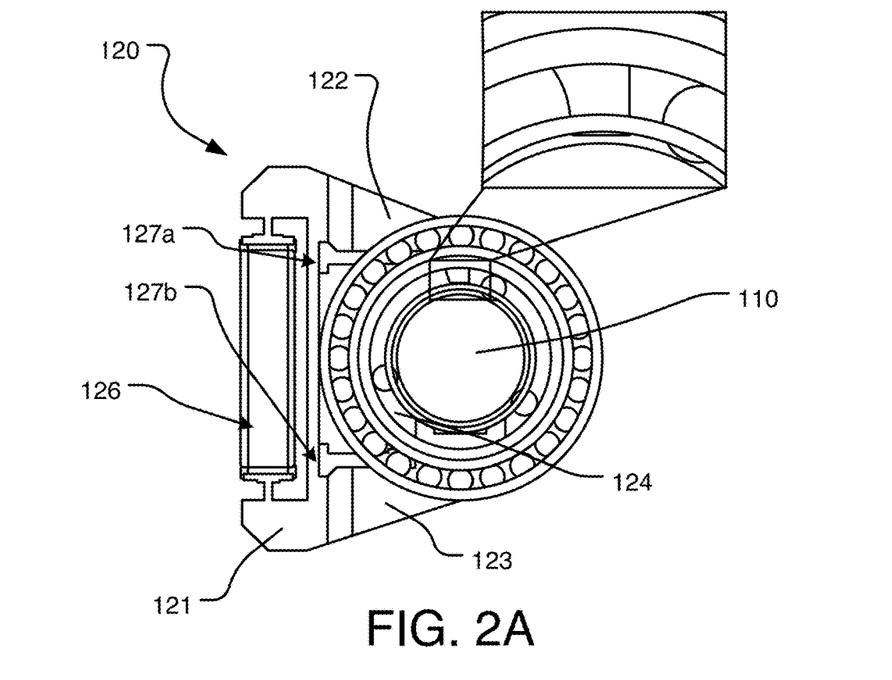
FIGS. 2A and 2B present top views of the brake crawler of FIG. 1 according to one aspect of the present disclosure.
Figure 2B:
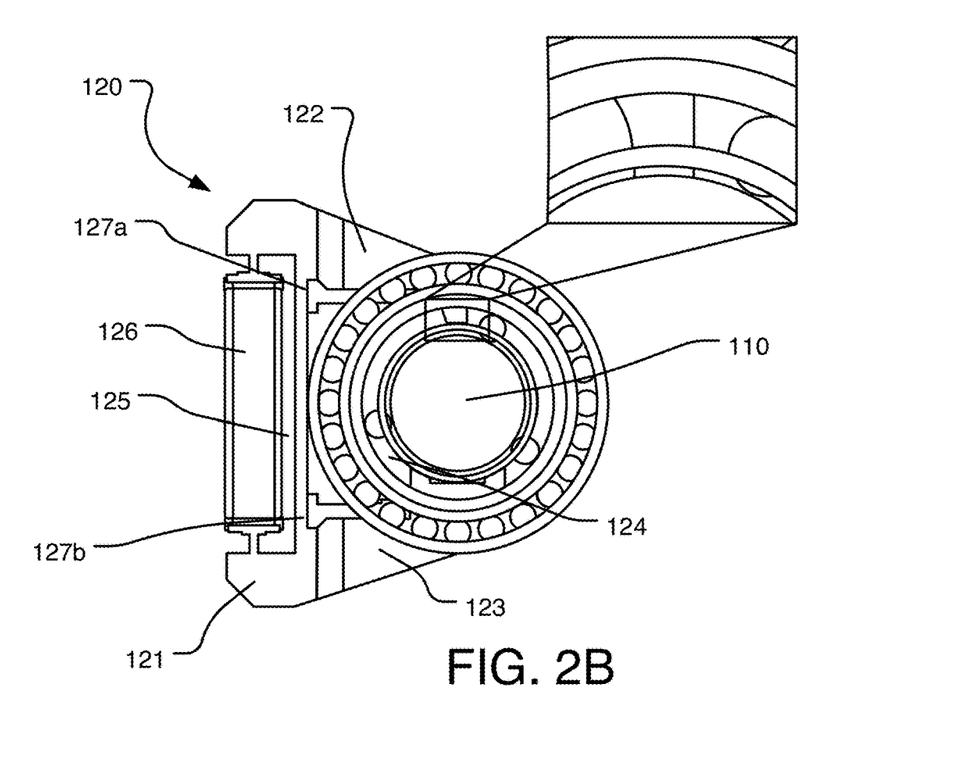
Figure 7:
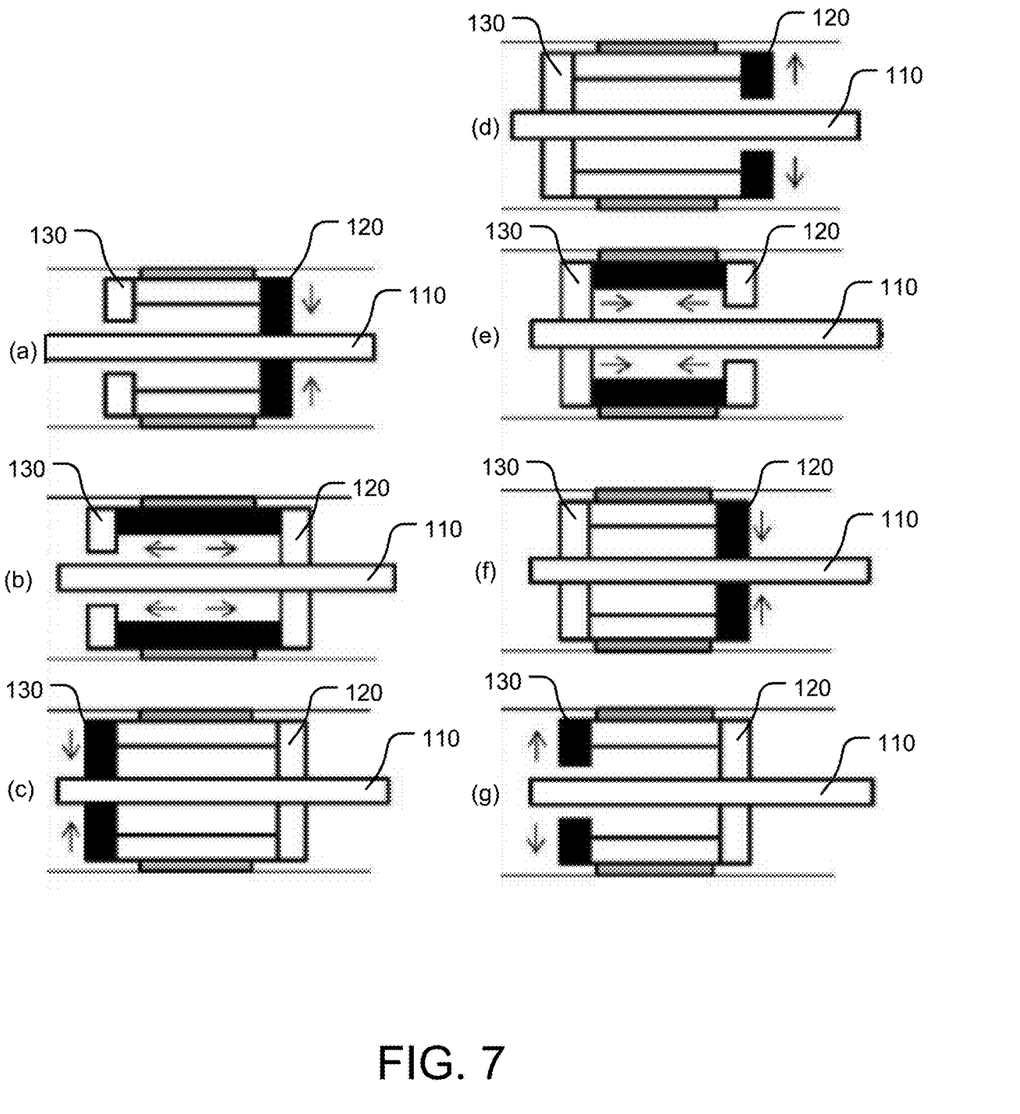
FIG. 7 presents an illustration of a sequence of movements for a brake crawler to perform inch worm movement along a shaft according to one aspect of the present disclosure.

With reference to FIGS. 1, 2A and 2B, a brake crawler 100 according to some embodiments described herein is shown mounted on shaft 110 positioned in a vertical orientation. As shown in FIG. 7, and as described in greater detail below, the brake crawler may be incorporated into an arm assembly or other component such that movement of the brake crawler 100 along the length of the shaft 110 provides Z-direction movement of the arm assembly or other component, which thereby allows the arm assembly to access various of the vertically stacked readable media disposed proximate the shaft 110 or allows other componentry to be moved in a vertical direction within the hard disk drive.

The brake crawler 100 generally includes a first set of clamp arms 120 and a second set of clamp arms 130, the second set of clamp arms 130 being disposed under or below the first set of clamp arms 120. Each of the first set of clamp arms 120 and the second set of clamp arms 130 generally include a base portion 121, 131 from which a first clamp arm 122, 132 and a second clamp arm 123, 133 extend. The first clamp arm 122, 132 is generally located at one end of the base portion 121, 131, while the second clamp arm 123, 133 is located at the opposite end of the base portion 121, 131. The first clamp arms 122, 132 and the second clamp arms 123, 133 extend from the base portion 121, 131 in the same direction, such that they define an opening 124, 134 (opening 134 shown in FIG. 4) located between first and second clamp arms 122, 123 of the first set of clamp arms 120 and between first and second clamp arms 132, 133 of the second set of clamp arms 130. When the brake crawler 100 is mounted on the shaft 110, the shaft resides within in the openings 124, 134.

The base portions 121, 131 include a recess 125, 135 within which is disposed an actuator element 126, 136 configured to move the arms 122, 123, 132, 133 when activated. Reference herein to an actuator element may include any type of device capable of moving arms 122, 123, 132, 133. For sake of simplicity, the remainder of this Detailed Description will refer to an actuator element as a piezoelectric element, which is one type of suitable actuator element that changes in size when activated to thereby move arms 122, 123, 132, 133. However, it should be appreciated that many other types of actuator elements, such as magnetic or shape memory alloys or bimetallics. The piezoelectric elements 126, 136 may be sized such that they have approximately the same length as the recesses 125, 135 when in a non-activated state. In this manner, when the piezoelectric elements 126, 136 are activated to expand in size, such as expansion in the length direction, the piezoelectric elements 126, 136 push against the base portions 121, 131 at the ends of the recesses 125, 135.

For the sake of the following explanation, FIGS. 2A and 2B are considered to be showing the first set of clamp arms 120. However, the following explanation applies equally to the operation of the second set of clamp arms 130, though the first set of clamp arms 120 and the second set of clamp arms 130 can operate independently of each other. The movement of the piezoelectric element 126 against the ends of the recess 125 as described above allows for the terminal ends of the first and second clamp arms 122, 123 of the first set of clamp arms 120 to move closer together. In some embodiments, such movement of the terminal ends of the clamp arms 122, 123 in response to the expansion of the piezoelectric elements is based on the clamp arms 122, 123 being connected with the base portion 121 at flex points or hinges 127a, 127b. When the shaft 110 is disposed in the opening 124, this movement together of terminal ends of clamp arms 122, 123 results in a clamping force being exerted against the shaft 110. As discussed in greater detail below, this clamping force allows for the brake crawler 100 to both lock in place at any position along the length of the shaft 110, and to perform an inch-worm type of movement of the brake crawler 100 up or down the shaft 110.

In FIG. 2A, the piezoelectric element 126 is in a non-activated (i.e., non-expanded) state. The piezoelectric element 126 resides against the base portion 121 at the ends of the recess 125 but does not push against the ends of the recess 125. As shown in the inset of FIG. 2A, the terminal end of the clamp arm 122 is spaced apart from the shaft 110 so as to not contact the shaft 110. The overall dimensions of the first set of clamp arms 120 are designed such that the terminal ends of the first clamp arm 122 and the second clamp arm 123 do not push or reside against the shaft 110 when the shaft 110 is disposed in the opening 124 and the piezoelectric element 126 is not activated. The clamp arms 122, 123 are connected to the base portion 121 via flex points 127a, 127b. The clamp arms 122, 123 are capable of bending/pivoting at the flex points 127a, 127b without breaking off from the base portion 121. The flex points 127a, 127b may be designed such that when no force is applied to the clamp arms 122, 123, they remain in the state shown in FIG. 2A, i.e., not touching or pushing against shaft 110. The flex points 127a, 127b can therefore be considered to be biased towards the state shown in FIG. 2A.

FIG. 2B illustrates how the clamp arms 122, 123 move when piezoelectric element 126 is activated and expands. More specifically, when the piezoelectric element 126 expands, it pushes against the base portion 121 at the ends of the recess 125. This outward movement of the base portion 121 causes the arms 122, 123 to effectively pivot inwardly at the flex points 127a, 127b, such that the terminal ends of the arms 122, 123 come closer together and push against the shaft 110, as shown in the inset of FIG. 2B. So long as the piezoelectric element 126 is activated, the arms 122, 123 remain pivoted inwardly and continue to exert clamping force on the shaft 110. When the brake crawler 100 is stationary, this clamping force allows the brake crawler to maintain an associated arm assembly at a desired position along the shaft 110. When the piezoelectric element 126 is deactivated, causing it to reduce in size and no longer push outwardly on the base portion 121, the bias of the flex points 127a, 127b results in the arms reverting back to the position shown in FIG. 2A, thereby removing the clamping force from the shaft 110.

Figure 3A:
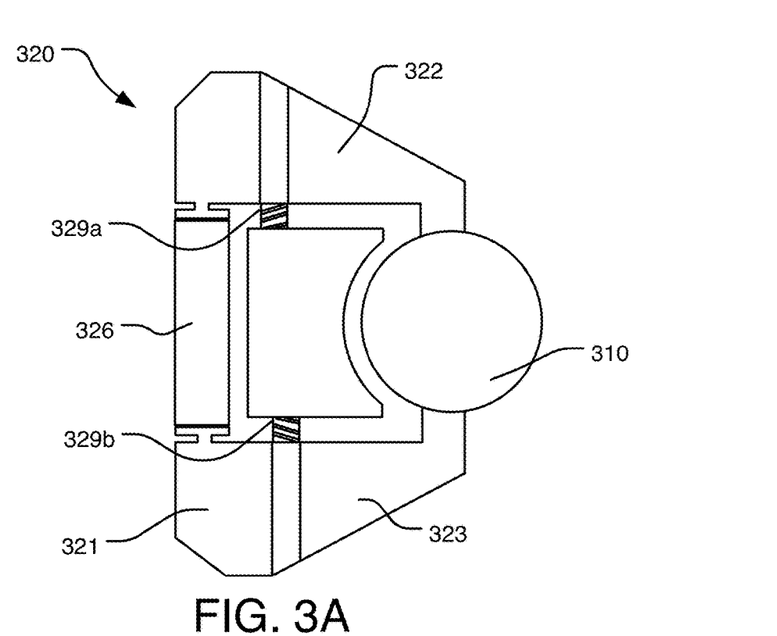
FIGS. 3A and 3B present top views of the brake crawler of FIG. 1 according to one aspect of the present disclosure.
Figure 3B:
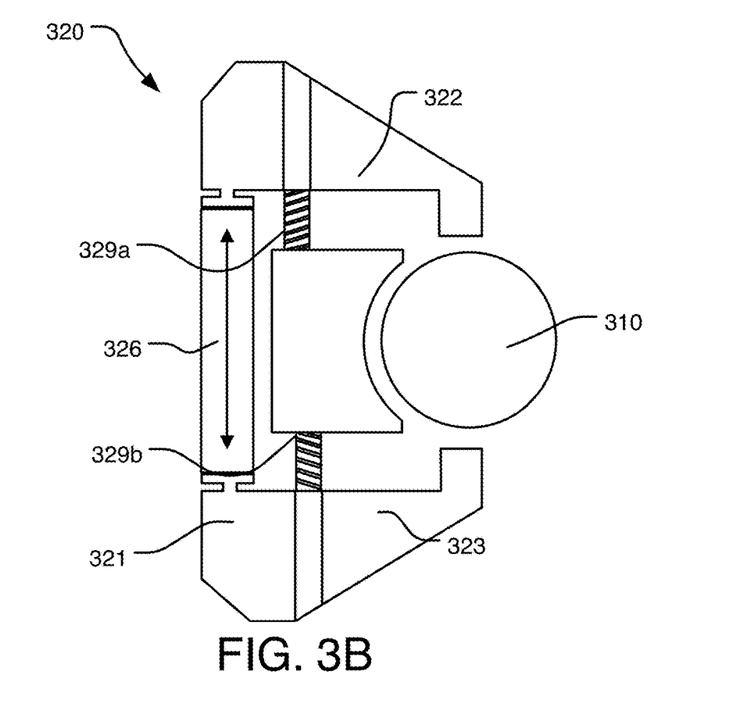

While FIGS. 1, 2A and 2B illustrate an embodiment where the brake crawler 100 includes flex points 127a, 127b for purposes of allowing the terminal ends of the clamp arms 122, 123 to move together and exert a clamping force against the shaft 110, it should be appreciated that other mechanisms for clamp arm movement to exert clamping force can also be used. In one non-limiting example shown in FIGS. 3A and 3B, clamp arms 322, 323 are connected with the base portion 321 via springs 329a, 329b instead of using flex points 127a, 127b as shown in FIGS. 2A and 2B. In such an embodiment, the arms 322, 323 may move towards and away from the base portion 321 without pivoting. That is to say, the arms 322, 323 will remain substantially parallel to one another as they move away from and back to the base portion 321. In the embodiment where springs 329a, 329b are used, the first set of clamp arms 320 may be designed and dimensioned such that the clamp arms 322, 323 exert a clamping force against the shaft 310 when the piezoelectric element 326 is deactivated, as shown in FIG. 3A. When the piezoelectric element 326 is activated, it expands in a similar fashion to the expansion described above with respect to FIGS. 1, 2A and 2B. However, in this embodiment, because the clamp arms 322, 323 are not connected to the base portion 321 via flex points, the expansion of the piezoelectric element 326 pushes the clamp arms 322, 323 away from the base portion 321, rather than pivoting the terminal ends towards the shaft 310, as shown in FIG. 3B. As the clamp arms 322, 323 are pushed away from the base portion 321, the terminal ends of the clamp arms 322, 323 disengage from the shaft 310 and thereby remove the clamping force from the shaft 310. When the piezoelectric element 326 is deactivated such that it reduces in size, the arms 322, 323 are pulled back towards the base portion 321 via springs 329a, 329b. The springs 329a, 329b recoil sufficiently to bring the clamp arms 322, 323 back towards the base portion 321 and reapply clamping force to the shaft 310 as shown in FIG. 3A.

Regardless of the specific manner in which the clamp arms move (e.g., via pivot points as shown in FIGS. 2A and 2B, via spring attachments as shown in FIGS. 3A and 3B, etc.), various combinations of piezoelectric elements can be used in the brake crawler 100 to achieve different effects. In some embodiments, the piezoelectric elements in the first and second set of clamp arms are similar or identical with respect to their rate of expansion when activated such that both sets of clamp arms 120, 130 exert similar or identical clamping forces on the shaft 110. In other embodiments, one of the two piezoelectric elements 126, 136 is designed to expand more than the other, such that the clamp arms associated with the piezoelectric element that expands more exerts more force on the shaft 110 when the piezoelectric element is activated than the other clamp arms. Such a configuration may be useful where one set of clamp arms is desired to be the primary braking/locking mechanism when it is desired to hold the associated arm assembly in place along the length of the shaft 110. In such configurations, the other set of clamp arms may serve only a supplemental or secondary braking/locking function, or may not be used for braking/locking at all. However, regardless of the difference in clamping force exerted based on the different piezoelectric elements used, both sets of clamping arms should be designed to apply some clamping force against the shaft in order to carry out the inch-worm movement of the brake crawler 100 up and down the shaft 110 as described in more detail below.

FIGS. 1, 2A, 2B, 3A and 3C generally illustrate embodiments of the pair of clamp arms in which one piezoelectric element per pair of clamp arms is used. However, it should be appreciated that more than one piezoelectric element per pair of clamp arms can also be used in order to increase the range and type of clamp arm possible. Furthermore, when multiple piezoelectric arms are incorporated into a pair of clamp arms, the multiple piezoelectric elements may be identical in terms of their rate and type of expansion, or may be different types of piezoelectric elements such that each piezoelectric element provides a different type or degree of movement. Similarly, while FIGS. 1, 2A, 2B, 3A and 3C generally show pairs of clamps arms that include two arms per pair of clamp arm and wherein each clamp arm is essentially an identical mirror of the opposing arm, it should be appreciated that each pair of clamp arms may include more or less than two arms, and that all arms need not be identical. The first pair of clamp arms also need not be identical to the second pair of clamp arms. For example, in one embodiment, the first set of clamp arms may be larger than the second set of clamp arms, with the first set of clamp arms serving as the primary brakes for the brake crawler as well as for inch worm-type movement, while the second pair of clamp arms are smaller and are used primarily for the inch worm-type movement of the brake crawler along the shaft and without providing a braking function.

Figure 4:
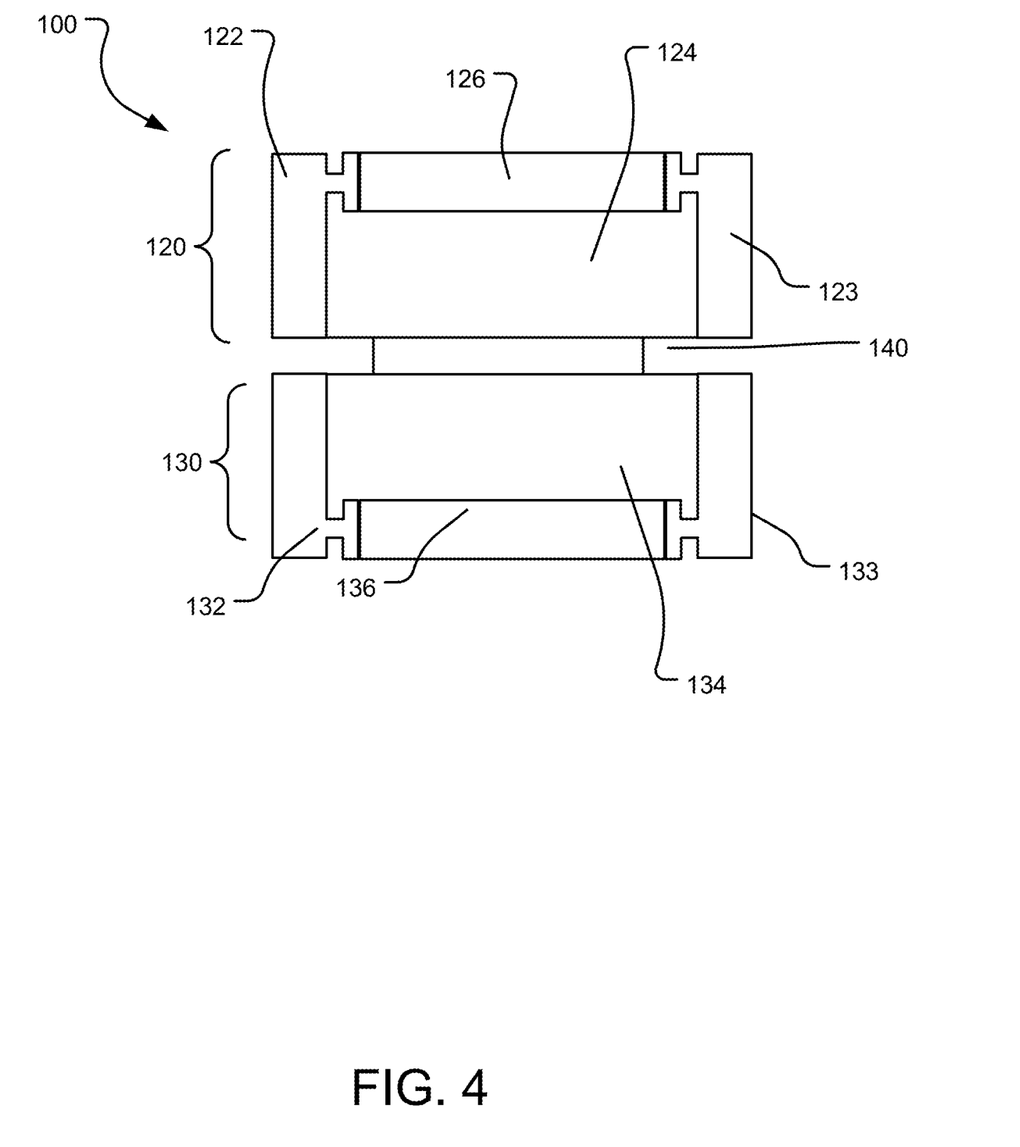
FIG. 4 presents a back view of the brake crawler of FIG. 1 according to one aspect of the present disclosure.
Figure 5A:
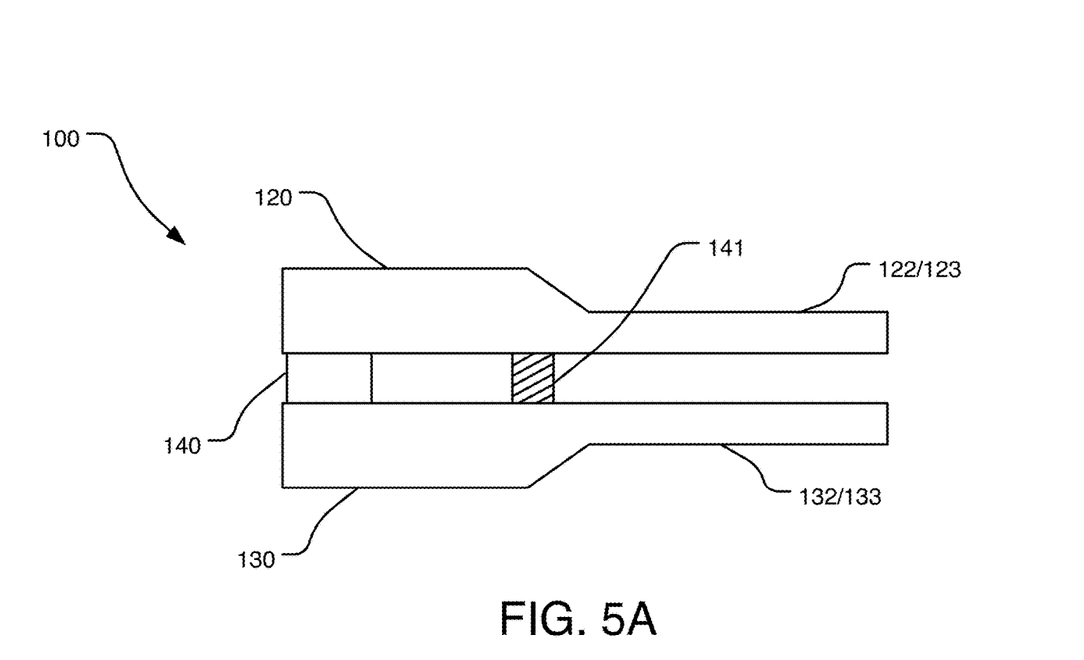
FIGS. 5A and 5B present side views of the brake crawler of FIG. 1 according to one aspect of the present disclosure.
Figure 5B:
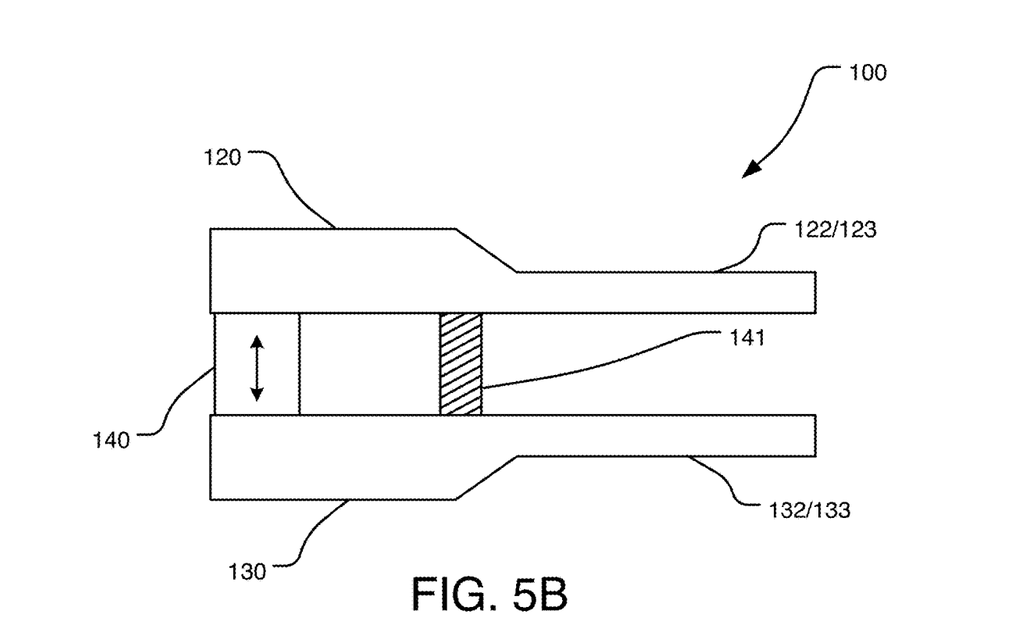

With reference to FIG. 4, which is a simplified back view of the brake crawler 100, a third piezoelectric element 140 is provided in the brake crawler 100, the third piezoelectric element 140 being positioned between the first set of clamp arms 120 and the second set of clamp arms 130 at a location generally opposite the terminal ends of the clamp arms 122, 123, 132, 133 of each of the first and second sets of clamp arms 120, 130. The third piezoelectric element 140 is configured to expand in at least a vertical direction such that activation of the third piezoelectric element 140 results in the pushing apart of the first set of clamp arms 120 and the second set of clamp arms 130. For example, as shown in FIG. 5A, which is a simplified side view of the brake crawler 100, the third piezoelectric element 140 is in a non-activated state such that first set of clamp arms 120 is relatively close together to second set of clamp arms 130. In FIG. 5B, third piezoelectric element 140 is activated, resulting in at least vertical expansion of the piezoelectric element 140. As the piezoelectric element 140 vertically expands, it pushes apart the first set of clamp arms 120 and the second set of clamp arms 130. As discussed in greater detail below, this ability to increase and decrease the distance between the first set of clamp arms 120 and the second set of clamp arms 130 allows the brake crawler 100 to perform a series of motions that results in inch-worm movement of the brake crawler 100 up or down the shaft 110.

FIGS. 5A and 5B include an optional spring 141 connecting the first set of clamp arms 120 to the second set of clamp arms 130. The spring 141 can be used to ensure that when the third piezoelectric element 140 is deactivated, the first set of clamp arms 120 and the second set of clamp arms 130 move back together via the recoiling of the spring 141. However, the inclusion of spring 141 may not be necessary, as the power of gravity alone may be suitable to bring the first set of clamp arms 120 back towards the second set of clamp arms 130 when the third piezoelectric element 140 is deactivated.

Figure 6A:
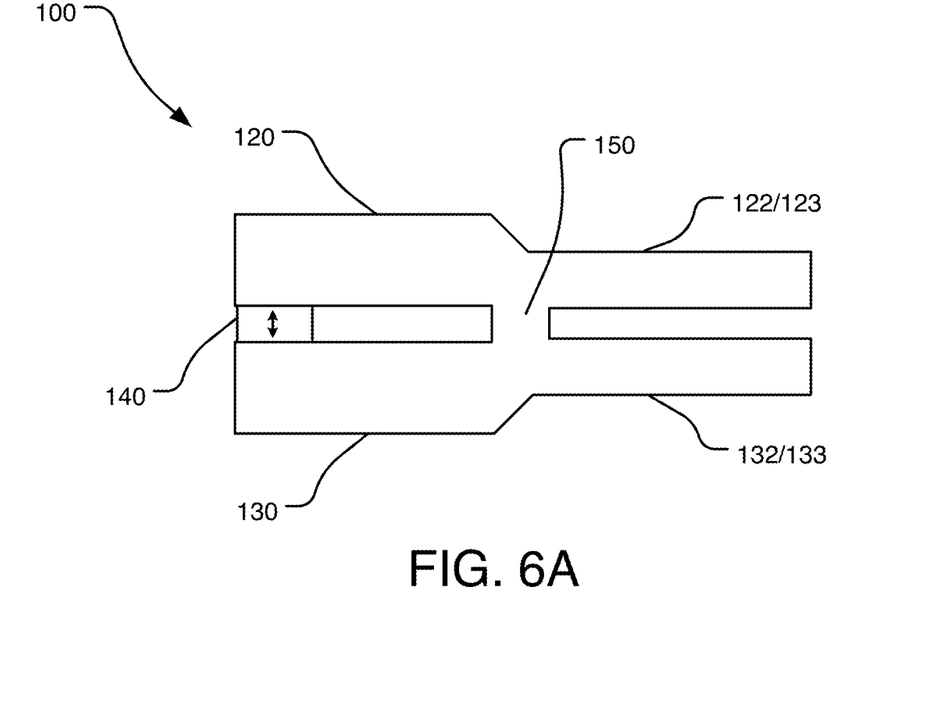
FIGS. 6A and 6B present side views of the brake crawler of FIG. 1 according to one aspect of the present disclosure.
Figure 6B:
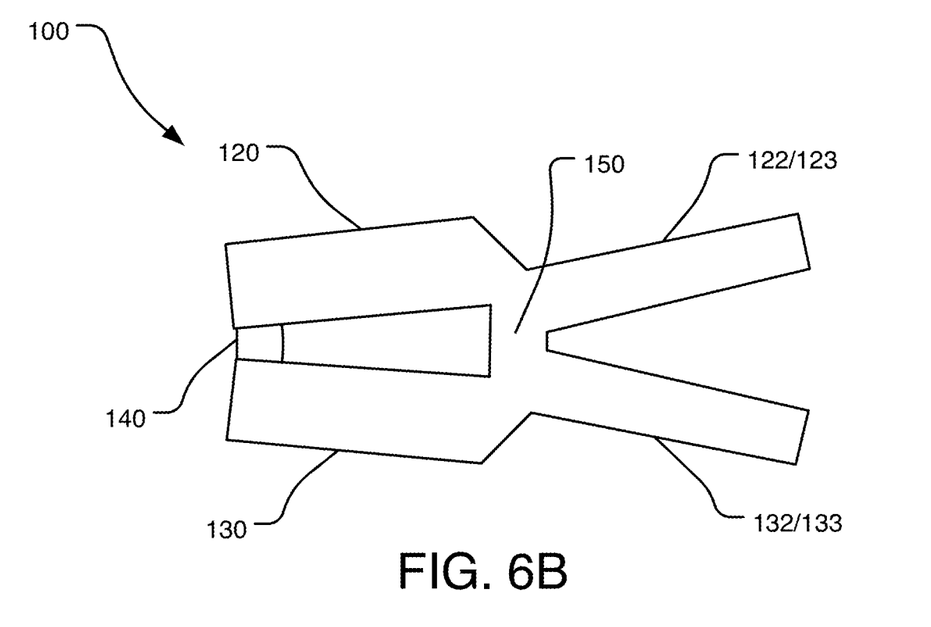

In the embodiment shown in FIGS. 5A and 5B, the first set of clamp arms 120 and the second set of clamp arms 130 are separate and distinct structures that do not form a unitary body. This allows the first set of clamp arms 120 to move away from the second set of clamp arms 130 based on the activation of the third piezoelectric element 140 as discussed above. However, it should be appreciated that other mechanisms for providing movement of the terminal ends of the clamp arms 122, 123 in the first set of clamp arms 120 away from the terminal ends of the clamp arms 132, 133 in the second set of clamp arms 130. One such alternate mechanism is shown in FIGS. 6A and 6B, wherein a pivot point or flex point 150 is provided to connect the first set of clamp arms 120 and the second set of clamp arms 130 and allow for the pivoting of the first set of clamp arms 120 and the second set of clamp arms 130 towards and away from each other. The pivot point 150 can be incorporated into a unitary body of the overall brake crawler as shown in FIGS. 6A and 6B, or the pivot point can be a distinct element connecting distinct and separate first set of clamp arms 120 and second set of clamp arms 130.

As shown in FIG. 6A, which is a simplified side view of the brake crawler 100, the first set of clamp arms 120 and the second set of clamp arms 130 are aligned essentially parallel to one another such that the terminal ends of the clamp arms 122, 123, 132, 133 are close together. This orientation is achieved when the third piezoelectric element 140 is activated and has expanded in at least the vertical direction to cause the first set of clamp arms 120 and the second set of clamp arms 130 to pivot at pivot point 150 towards each other at the terminal ends of the clamp arms. In this embodiment, the pivot point 150 is biased against the position shown in FIG. 6A, such that when the third piezoelectric element 140 is deactivated and reduces in size in the vertical direction, the terminal ends of the first set of clamp arms 120 and the second set of clamp arms 130 move away from each other by virtue of the first set of clamp arms 120 and the second set of clamp arms 130 pivoting outwardly at the pivot point 150 until the pivot point 150 reaches its bias position. The bias position of the pivot point 150 is shown in FIG. 6B, where the terminal ends of the clamp arms of each of the first set of clamp arms 120 and the second set of clamp arms 130 are further away from each other than in FIG. 6A.

While FIGS. 4, 5A, 5B, 6A and 6B illustrate one piezoelectric element used for increasing and decreasing the distance between the first set of clamp arms and the second set of clamp arms in the Z-direction, it should be appreciated that more than one piezoelectric element can be located between the first set of clamp arms and the second set of clamp arms to provide additional functionality. Additionally, the one or more piezoelectric elements located between the first set of clamp arms and the second set of clamp arms may be configured to allow for various separation distances between the first and second set of clamp arms. In some embodiments, the amount of expansion or contraction of the piezoelectric element positioned between the first and second set of clamp arms is controllable to allow for various intermediate spacings between the first and second set of clamp arms, rather than just allowing for full expansion and full contraction which would only permit for two distances between the first and second set of clamp arms.

As noted previously, the ability of each of the first and second set of clamp arms 120, 130 of the brake crawler 100 to independently exert and release a clamp force on the shaft 101, and the ability to increase and decrease the distance between the terminal ends of the clamp arms of first set of clamp arms 120 and the second set of clamp arms 130 allows for the brake crawler 100 to move up and down the shaft 110 using an inch-worm sequence of movements. When an arm assembly is associated with the brake crawler 100, this allows for the brake crawler 100 to move an arm assembly up and down the shaft 110 to thereby align with and access any of the readable media vertically stacked in an elevator-type hard disk drive. FIG. 7 illustrate the sequence of movements that can be carried out in to perform this inch worm type movement of the brake crawler 100. At (a), the brake crawler is oriented such that the first set of clamp arms 120 are engaged with and exerting a force against the shaft 110, while the second set of clamp arms 130 are disengaged with the shaft 100. In some embodiments, this may be accomplished by activating the piezoelectric element in the recess of the base of the first set of clamp arms 120 and deactivating the piezoelectric element in the recess of the base of the second set of clamp arms 130 (e.g., when a pivot configuration as shown in FIGS. 2A and 2B is used), or vice versa (e.g., when a spring loaded configuration as shown in FIGS. 3A and 3B is used). At (a), the piezoelectric element located between the first set of clamp arms 120 and the second set of clamp arms 130 is in whichever state causes the terminal ends of the clamp arms to be closest together (e.g., deactivated when using the configuration shown in FIGS. 5A and 5B, or activated when using the configuration shown in FIGS. 6A and 6B).

At (b), the state of the piezoelectric element located between the first set of clamp arms 120 and the second set of clamp arms 130 is changed from its state in (a) so that the terminal ends of each of set of the clamp arms move away from each other. The first set of clamp arms 120 remain engaged with the shaft 110 and the second set of clamp arms 130 remain disengaged with the shaft 110 during (b). At (c), the state of the piezoelectric element associated with the second set of clamp arms 130 is changed from its state in (a) so that the clamp arms of the second set of clamp arms 130 engage with and exert a force against the shaft 110. The first set of clamp arms 120 remain engaged with the shaft 110 and the first set of clamp arms 120 remain distanced away from the second set of clamp arms 130 during (c). At (d), the piezoelectric element associated with the first set of clamp arms 120 is changed such that the first set of clamp arms 120 disengage with the shaft 110. The second set of clamp arms 130 remain engaged with the shaft 110 and the first set of clamp arms 120 remain distanced away from the second set of clamp arms 130 during (d). At (e), the piezoelectric element located between the first set of clamp arms 120 and the second set of clamp arms 130 is changed so that the first set of clamp arms 120 moves closer to the second set of clamp arms 130. The first set of clamp arms 120 remain disengaged with the shaft 110 and the second set of clamp arms 130 remain engaged with the shaft 110 during (e).

At (f), the piezoelectric element associated with the first set of clamp arms 120 is changed so that the first set of clamp arms 120 exert a force against the shaft 110. The second set of clamp arms 130 remain engaged with the shaft 110 and the first set of clamp arms 120 and the second set of clamp arms remain close together during (f). At this point in the sequence of movements, the brake crawler 100 has now moved down the shaft 110, as the first set of clamp arms 120 are now engaged with the shaft 110 at a lower position on the shaft than as shown in (a). At (g), the piezoelectric element associated with the second set of clamp arms 130 is changed to release the second set of clamp arms 130 from the shaft, and the configuration of the brake crawler has reverted back to the configuration of (a), such that the sequence of movements (a)-(f) can be repeated to continue to move the brake crawler 100 down the shaft 110.

The sequence of movements described above with respect to FIG. 7 can be reversed in order to move the brake crawler 100 up the shaft 110. Additionally, the incremental movement of the brake crawler 100 either up or down the shaft 100 via this sequence of motion allows for precision placement and location of the brake crawler along the shaft, which allows for accurate alignment of the brake crawler and associated arm assembly with the desired readable media in the vertical stack.

Figure 8:
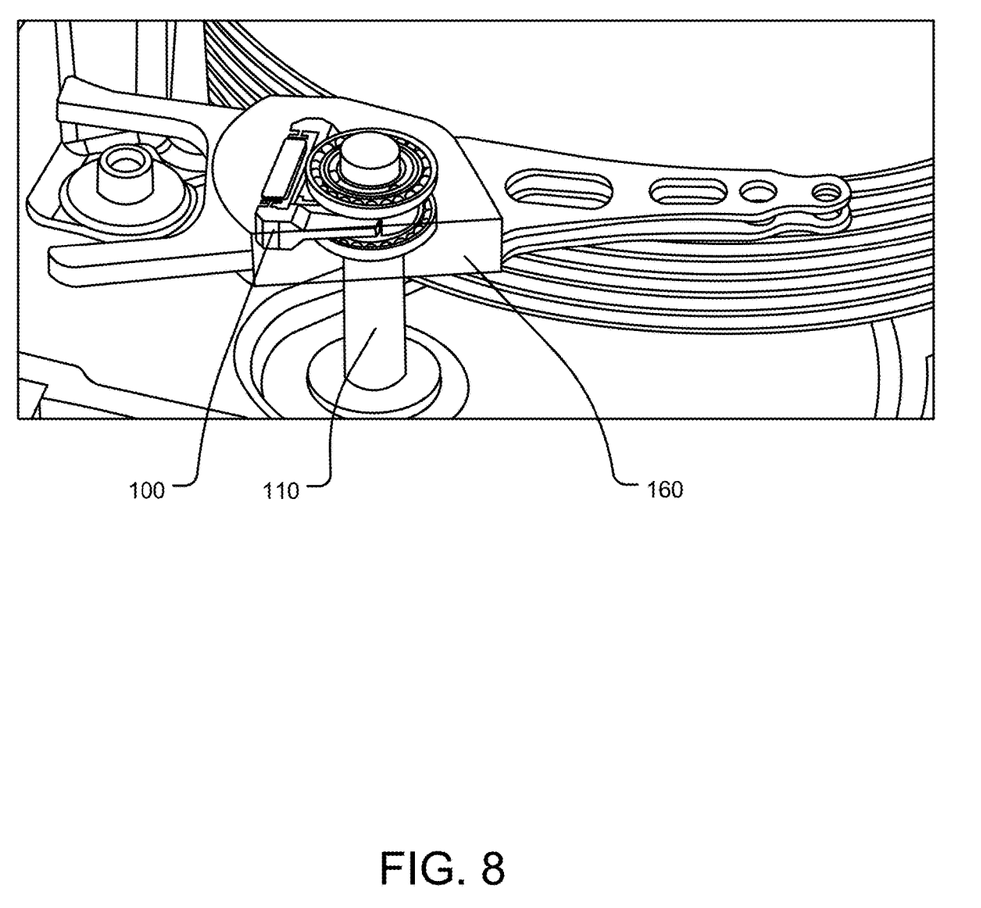
FIG. 8 presents a perspective, partially transparent view of a brake crawler incorporated into an arm assembly of an elevator-type hard disk drive according to one aspect of the present disclosure.

FIG. 8 illustrates how the brake crawler 100 described herein can be incorporated into an arm assembly 160 such that movement of the brake crawler 100 up or down the shaft 110 results in movement of the arm assembly 160 up or down the shaft 110. The arm assembly 160 is able to pivot about the axis of the shaft 110 such that the terminal end of the arm assembly 160 can overlap with whichever readable media in the vertical stack the brake crawler 100 has aligned the arm assembly 160 with. The brake crawler 100 can be configured to rotate with the arm assembly 160 as it pivots about the axis of the shaft 110, or the brake crawler 100 may remain stationary (i.e., not rotate) when the arm assembly 160 rotates. Furthermore, while arm assembly 160 is shown in FIG. 8 as pivoting about the axis of the shaft to which the brake crawler 100 is engaged, the arm assembly 160 could be configured to rotate about a separate axis from the axis of shaft 110. That is to say, the configuration of the hard disk drive may include more than one vertical shafts, and the brake crawler may be engaged with a first vertical shaft, while rotation of the arm assembly is about the axis of a second shaft.

As shown in FIG. 8, the arm assembly 160 generally includes two arm extensions stacked one on top of the other with a gap therebetween. When accessing one of the readable media in the stack of readable media, the arm assembly will generally be vertically positioned such that when the arm pivots towards the readable media, one of the arm extensions is located above the selected readable media and the other arm extension is located below the selected readable media. While not shown in FIG. 8, in one embodiments, each of the arm extensions of the arm assembly is integrated with one of the first and second set of clamp arms such that movement in the Z-direction of the first or second set of clamp arms results in corresponding movement of the associated arm extension. This is in contrast the embodiment shown in FIG. 8 wherein the brake crawler 100 is located within the arm assembly so that movement of the brake crawler as a whole results in movement of the arm assembly as a whole, but there is no connection or association between components of the brake crawler and the arm extensions of the arm assembly. In the configuration shown in FIG. 8, the arm extensions are maintained apart from each other at a constant distance while they move up and down the shaft. In the alternate embodiment described previously where the arm extensions are integral with a set of the clamp arms, the distance between the arm extensions can change as the distance between sets of clamp arms changes.

In the above described alternate embodiment including arm extensions that are integral with the set of clamp arms, additional piezoelectric elements may be provided between the arm extensions so that the additional piezoelectric elements can contribute to the movement of the arm extensions away from and towards each other. In some embodiments, such piezoelectric elements are configured to maintain the arm extensions in parallel as they move towards and away from each other. In other embodiments, the additional piezoelectric elements are configured such that the arm extensions can pivot, in which case the distance between the terminal ends of the arm extensions may increase and decrease while the base portion of the arm extensions (i.e., closer to the brake crawler) do not move closer or farther away from each other, or move closer and farther away from each other at a lesser degree than the change in distance between the terminal ends of the arm extensions. Such embodiments may permit the arm extensions to perform a pinching or clamping function at the terminal ends, such as pinching or clamping the readable media or a ramp that may be located proximate the terminal ends of the arm extensions.

While the above Detailed Description describes the brake crawler primarily with respect to its use in elevator-type hard disk drives and as a mechanism moving an arm assembly up and down a shaft, it should be appreciated that the brake crawler can be used in any suitable device requiring braking/locking and Z-motion along a shaft and/or in connection with movement in the Z-direction of other components of a hard disk drive or other device.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

We claim:

1. A brake crawler assembly configured for vertically moving an arm assembly along a slider shaft in a hard disk drive, comprising:
   a first set of clamp arms comprising:
      a first base portion including a recess within which is disposed a first actuator element; and
      a first clamp arm extending from one end of the first base portion and a second clamp arm extending from a second end of the first base portion in the same direction as the first clamp arm, an open area provided between the first and second clamp arms;
   a second set of clamp arms positioned below the first set of clamp arms, the second set of clamp arms comprising:
      a second base portion including a recess within which is disposed a second actuator element; and
      a first clamp arm extending from one end of the second base portion and a second clamp arm extending from a second end of the second base portion in the same direction as the first clamp arm of the second set of clamp arms, an open area provided between the first and second clamp arm of the second set of clamp arms; and
   a third actuator element disposed between the first base portion of the first set of clamp arms and the second base portion of the second set of clamp arms.

2. The brake crawler assembly of claim 1, wherein each of the first actuator element, the second actuator element and the third actuator element is a piezoelectric element.

3. The brake crawler assembly of claim 2, wherein the first piezoelectric element and the second piezoelectric element are configured to expand at least in a direction towards the ends of the first and second base portions, respectively, when activated, such expansion causing terminal ends of the first clamp arms and the second clamp arms to move closer together and provide a clamp force against an object located in the open area of the first set of clamp arms and the second set of clamp arms.

4. The brake crawler assembly of claim 2, wherein the third piezoelectric element is configured to expand at least in a direction towards the first set of clamp arms and the second set of clamp arms when activated, such expansion causing the distance between terminal ends of the first and second clamp arms of the first set of clamp arms and terminal ends of the first and second clamp arms of the second set of clamp arms to change.

5. The brake crawler assembly of claim 2, wherein the first piezoelectric element and the second piezoelectric element have different expansion profiles when activated.

6. The brake crawler assembly of claim 1, wherein the brake crawler assembly is monolithic.

7. The brake crawler assembly of claim 2, wherein the first clamp arm and the second clamp arm of each of the first set of clamp arms and the second set of clamp arms are hingedly connected with the first and second base portions, respectively.

8. The brake crawler assembly of claim 7, wherein the first clamp arm and second clamp arm of each of the first set of clamp arms and the second set of clamp arms pivot about the hinged connection upon activation of the first and second piezoelectric element, respectively.

9. The brake crawler assembly of claim 7, wherein the hinged connections are biased towards a non-clamp position such that when the first and second piezoelectric elements are deactivated, the hinged connections return the first and second set of clamp arms to the non-clamp position.

10. The brake crawler assembly of claim 2, wherein the first clamp arm and the second clamp arm of each of the first set of clamp arms and the second set of clamp arms are spring mounted with the first and second base portions, respectively.

11. The brake crawler assembly of claim 10, wherein the spring mounts recoil to pull the first clamp arm and the second clamp arm of each of the first set of clamp arms and the second set of clamp arms back to a non-clamp position when the first and second piezoelectric elements are deactivated.

12. The brake crawler assembly of claim 10, wherein the first clamp arm and the second clamp arm of each of the first set of clamp arms and the second set of clamp arms are hingedly connected with the first and second base portions, respectively.

13. The brake crawler assembly of claim 10, wherein the first clamp arm and the second clamp arm of each of the first set of clamp arms and the second set of clamp arms are not hingedly connected with the first and second base portions, respectively.

14. The brake crawler assembly of claim 2, wherein the first set of clamp arms and the second set of clamp arms are hingedly connected.

15. The brake crawler assembly of claim 14, wherein the hinged connection is biased towards a separated position such that when the third piezoelectric element is deactivated, the hinged connection returns the first set of clamp arms and the second set of clamp arms to the separated position.

16. A method of moving an arm assembly of a hard disk drive vertically along a slider shaft of a hard disk drive, the method comprising:
  providing the arm assembly through which the slider shaft passes such that the arm assembly is capable of moving vertically along the slider shaft, the arm assembly having a brake crawler incorporated therein, the brake crawler comprising:
    a first set of clamp arms comprising:
      a first base portion including a recess within which is disposed a first actuator element; and
      a first clamp arm extending from one end of the first base portion and a second arm extending from a second end of the first base portion in the same direction as the first clamp arm, the slider shaft being disposed between the first clamp arm and the second clamp arm;
    a second set of clamp arms positioned below the first set of clamp arms, the second set of clamp arms comprising:
      a second base portion including a recess within which is disposed a second actuator element; and
      a first clamp arm extending from one end of the second base portion and a second clamp arm extending from a second end of the second base portion in the same direction as the first clamp arm of the second set of clamp arms, the slider shaft being disposed between the first clamp arm and the second clamp arm of the second set of clamp arms; and
    a third actuator element disposed between the first and second base portions;
  activating the first actuator element such that the first set of clamp arms exerts a clamp force against the slider shaft;
  deactivating the third actuator element such that terminal ends of the first and second clamp arms of the second set of clamp arms moves away from terminal ends of the first and second clamp arms of the first set of clamp arms;
  activating the second actuator element such that the second set of clamp arms exerts a clamp force against the slider shaft;
  deactivating the first actuator element such that the first set of clamp arms releases the slider shaft; and
  activating the third actuator element such that the terminal ends of the first and second clamp arms of the first set of clamp arms moves closer to the terminal ends of the first and second clamp arms of the second set of clamp arms.

17. The method of claim 16, wherein the first set of clamp arms and the second set of clamp arms are hingedly connected.

18. The method of claim 17, wherein the hinged connection is biased towards a separated position such that when the third actuator element is deactivated, the hinged connection returns the first set of clamp arms and the second set of clamp arms to the separated position.

19. A method of moving an arm assembly of a hard disk drive vertically along a slider shaft of a hard disk drive, the method comprising:
  providing the arm assembly through which the slider shaft passes such that the arm assembly is capable of moving vertically along the slider shaft, the arm assembly having a brake crawler incorporated therein, the brake crawler comprising:
    a first set of clamp arms comprising:

a first base portion including a recess within which is disposed a first actuator element; and     a first clamp arm extending from one end of the first base portion and a second clamp arm extending from a second end of the first base portion in the same direction as the first clamp arm, the slider shaft being disposed between the first clamp arm and the second clamp arm;

a second set of clamp arms positioned below the first set of clamp arms, the second set of clamp arms comprising:

a second base portion including a recess within which is disposed a second actuator element; and     a first clamp arm extending from one end of the second base portion and a second clamp arm extending from a second end of the second base portion in the same direction as the first clamp arm of the second set of clamp arms, the slider shaft being disposed between the first clamp arm and the second clamp arm of the second set of clamp arms; and a third actuator element disposed between the first and second base portions;

activating the first actuator element such that the first set of clamp arms exerts a clamp force against the slider shaft;

activating the third actuator element such that terminal ends of the first and second clamp arms of the second set of clamp arms moves away from terminal ends of the first and second clamp arms of the first set of clamp arms;

activating the second actuator element such that the second set of clamp arms exerts a clamp force against the slider shaft;

deactivating the first actuator element such that the first set of clamp arms releases the slider shaft; and     deactivating the third actuator element such that the terminal ends of the first and second clamp arms of the first set of clamp arms moves closer to the terminal ends of the first and second clamp arms of the second set of clamp arms.

20. The method of claim 19, wherein the first set of clamp arms and the second set of clamp arms are spring mounted with each other and the spring mount recoils to pull together the first set of clamp arms and the second set of clamp arms when the third actuator element is deactivated.

\* \* \* \* \*